United States Patent
Olfat et al.

(10) Patent No.: US 7,961,610 B1
(45) Date of Patent: Jun. 14, 2011

(54) METHOD AND SYSTEM FOR OVERLOAD CONTROL

(75) Inventors: Masoud Olfat, Great Falls, VA (US); Mohammad Hassan Partovi, Potomac, MD (US); Mehdi Alasti, Rockville, MD (US)

(73) Assignee: Clear Wireless LLC, Kirkland, WA (US)

( * ) Notice: Subject to any disclaimer, the term of this patent is extended or adjusted under 35 U.S.C. 154(b) by 697 days.

(21) Appl. No.: 12/062,192

(22) Filed: Apr. 3, 2008

(51) Int. Cl.
*H04L 12/28* (2006.01)
*H04W 4/00* (2009.01)
*H04W 72/00* (2009.01)
*G06F 15/173* (2006.01)

(52) U.S. Cl. ........ 370/230; 370/235; 370/332; 455/453; 709/223

(58) Field of Classification Search ....... 370/229–238.1, 370/310–350; 455/450–455, 464; 709/223–226, 709/230–244
See application file for complete search history.

(56) References Cited

U.S. PATENT DOCUMENTS

| | | | |
|---|---|---|---|
| 6,061,559 A | 5/2000 | Eriksson et al. | |
| 6,415,153 B1 | 7/2002 | Liew | |
| 6,469,991 B1 | 10/2002 | Chuah | |
| 6,889,048 B1 | 5/2005 | Koo | |
| 7,010,661 B2* | 3/2006 | Kamel et al. | 711/171 |
| 7,174,379 B2* | 2/2007 | Agarwal et al. | 709/226 |
| 7,177,649 B1 | 2/2007 | Nielsen | |
| 7,206,593 B1 | 4/2007 | Yarkosky et al. | |
| 7,218,619 B2 | 5/2007 | Koo et al. | |
| 7,321,568 B2* | 1/2008 | Kosanovic et al. | 370/286 |
| 2005/0138165 A1* | 6/2005 | Tang et al. | 709/224 |
| 2005/0235288 A1* | 10/2005 | Yamakabe et al. | 718/100 |
| 2006/0224706 A1* | 10/2006 | Kudo et al. | 709/220 |
| 2007/0118414 A1* | 5/2007 | Asaki et al. | 705/7 |

OTHER PUBLICATIONS

Haitao Lin et al., "Wireless Networks Revenue Optimization through Overload Control with Priority Services", Journal of Communications, vol. 1, No. 4, Jul. 2006.
Ling-Jyh Chen et al., "A Smart Decision Model for Vertical Handoff", printed from the World Wide Web at least as early as Feb. 22, 2008.

* cited by examiner

*Primary Examiner* — Tri H Phan
(74) *Attorney, Agent, or Firm* — McDonnell Boehnen Hulbert & Berghoff LLP (57) ABSTRACT

Methods and systems are provided for overload control in a wireless communication system. An overload control mechanism identifies an instance of use to eliminate from among a plurality of instances of use in a wireless coverage area. In an overload situation, the overload control mechanism may, for each instance of use, determine a respective ratio of the value of instance of use to the quantity of resource consumed by the instance of use. The overload control mechanism may then sort the instances of use in order of determined ratios to produce a sorted order of the instances of use. The overload control mechanism may select as many instances of use as possible, such that the total amount of resources consumed by the selected instances of use is as high as possible without exceeding the threshold load, and then the overload control mechanism may eliminate the remaining instances of use.

19 Claims, 4 Drawing Sheets

METHOD AND SYSTEM FOR OVERLOAD CONTROL

BACKGROUND

In a typical cellular radio communications system (wireless communication system), an area is divided geographically into a number of cell sites, each defined by a radio frequency (RF) radiation pattern from a respective base transceiver station (BTS) antenna. The base station antennae in the cells are in turn coupled to a telecommunications switch or gateway, such as a WiMAX ASN gateway for instance. The switch or gateway may then be coupled with a transport network, such as the public switched telephone network (PSTN) or a packet-switched network (e.g., the Internet).

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the transport network, via the air interface, the BTS, the BSC and the switch or gateway.

With the explosive growth in demand for wireless communications, the level of call traffic in most cell sites has increased drastically over the years. To help manage the call traffic, most cells in a wireless network are usually further divided geographically into a number of sectors, each defined respectively by radiation patterns from directional antenna components of the respective BTS, or by respective BTS antennae. These sectors (which can be visualized ideally as pie pieces) can be referred to as "physical sectors," since they are physical areas of a cell site. Therefore, at any given instance, a mobile station in a wireless network will typically be positioned in a given physical sector and will be able to communicate with the transport network via the BTS serving that physical sector.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Introduction

The present invention provides a method and system for overload control in a coverage area of a wireless communication system.

Typically, a coverage area has a limited amount of air-link resources available. Further, depending on the air-link quality, mobile stations operating in the coverage area might require different amounts of air-link resources in order to achieve the same quality of service (QoS). QoS may be defined in various ways. For instance, QoS may be defined by delay, jitter, throughput, packet-loss, availability, call drop rate, and/or data transfer rate. The resources required to deliver a desired QoS to a mobile station operating in a coverage area may differ depending on the location of a mobile station in a coverage area. For example, a mobile station at the edge of a coverage area may require more air-link resources than a mobile station close to the base station in order to achieve the same data transfer rate, which is the rate at which data is transferred to a mobile station.

In some instances, it is possible that the resources required cooperatively by all of the mobile stations operating in a coverage area may be greater than the total available resources of the coverage area. When the resources required by all of the mobile stations operating in a coverage area are greater than total available resources of the coverage area, an overload of the system resources occurs. In the event of an overload, some mobile stations consuming resources may need to be released from the coverage area in order to help resolve the overload situation. Therefore, in an overload situation it may be beneficial to manage the release of some of the resources from the coverage area. An overload control mechanism may be useful for managing the release of resources.

There may be a plurality of instances of use ongoing in the wireless coverage area and each instance of use may have a value associated with it. The value of each instance of use may, for example, depend on how much revenue the instance of use creates for the wireless service provider. Further, each instance of use in the coverage area may consume a certain amount of air-link resources. In the exemplary embodiment, an overload control mechanism manages the release of resources in the event of an overload of system resources in a manner that is geared towards maximizing the value per consumed resources of the coverage area. In other words, in the event of an overload, the overload control mechanism operates to help maximize profits for the wireless service provider.

When the total amount of resources required by the plurality of instances of use is greater than the total amount of resources in the system, the overload control mechanism may determine a respective ratio of value of instance of use to a quantity of resource consumed by the instance of use for each instance of use in the coverage area. The overload control mechanism may then use the respective ratios in order to manage the release of resources from the wireless coverage area in an overload situation.

By using the respective ratios in order to manage the release of resources, the overload control mechanism preferably first releases from the wireless coverage area resources that may have a low value per consumed resource. Therefore, in the event of an overload, the instances of use having a low value per consumed resource will be released and the instances of uses that are more valuable to the wireless service provider will remain in the coverage area. By keeping the instances of use that are more valuable in the coverage area and releasing instance of use that are less valuable in the event of an overload, the overload control mechanism operates to help maximize profits for the wireless service provider.

In the exemplary embodiment, the overload control mechanism may detect a threshold load in the coverage area. After detecting a threshold load, the overload control mechanism may, for each instance of use ongoing in the coverage area, determine a respective ratio of the value of the instance of use to the quantity of resource consumed by the instance of use. The overload control mechanism may then sort the instances of use in order of the determined ratios, from highest ratio to lowest ratio, to produce a sorted order of the instances of uses. In turn, the overload control mechanism may select from the sorted order, beginning at the instance of use having the highest ratio, as many instances of use as possible, such that the total amount of resources consumed by the selected instances of use is as high as possible without exceeding the threshold load. The overload control mechanism may then identify as instances of use to eliminate from the coverage area all of the instances of use in the sorted order other than the selected instances of use.

In the exemplary embodiment, the overload control mechanism may then eliminate from the coverage area all of the identified instances of use. The overload control mechanism may eliminate the instances of use from the coverage area in numerous ways. For example, if the wireless communication system includes a base station transmitting on a first carrier frequency, the overload control mechanism may eliminate the instances of use from the system by handing over the instances of use to a second carrier frequency of the same base station. As another example, where the instances of use are in a first sector of a base station, the overload control mechanism may hand over the instances of use to a second sector of the same base station. As yet another example, where the instances of use are at a first base station, the overload control mechanism may eliminate the instances of use from the system by handing over the instances of use to a second base station. And as yet another example, the overload control mechanism may eliminate the instances of use from the system by forcing the mobile stations of the instances of use into idle mode. Additionally or alternatively, the overload control mechanism may eliminate the instances of use from the system by dropping the instances of use from the wireless communication system.

2. Exemplary Communication System Architecture

Figure 1:
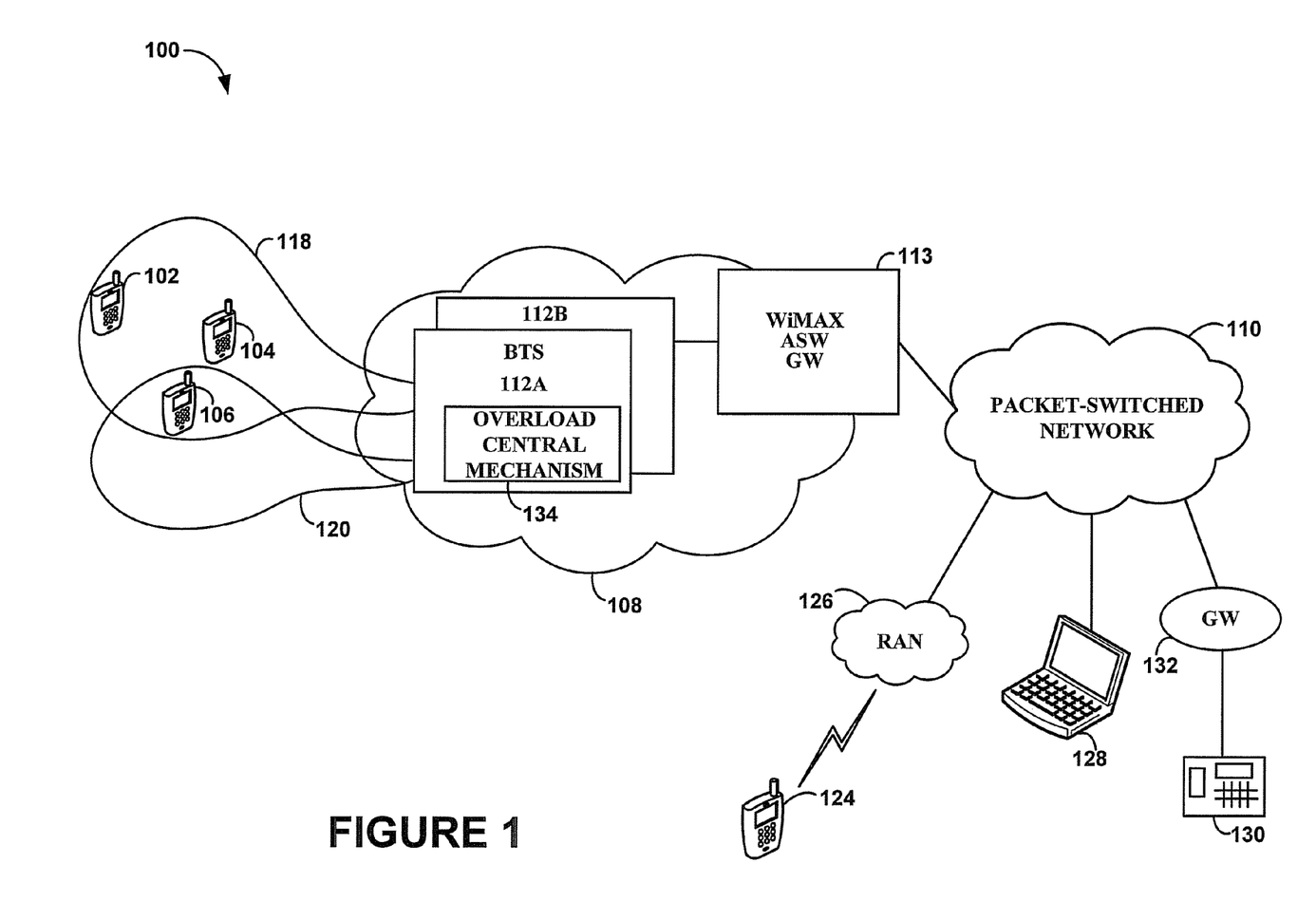
FIG. 1 is a simplified block diagram of a communication system in which the exemplary embodiment of the invention can be employed.

FIG. 1 is a simplified block diagram of a communication system, in accordance with an exemplary embodiment. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

System 100 includes mobile stations 102, 104, 106 (or other client devices) that can be linked by a radio access network (RAN) 108 with a packet-switched network 110, such as an IP network. Mobile stations 102, 104, 106 can take various forms, examples of which include a mobile phone, a personal digital assistant, a wirelessly equipped personal computer, or another wirelessly equipped device of any sort (whether technically "mobile" or fixed/stationary). RAN 108 generally functions, preferably in a conventional manner, to serve wireless mobile stations such as mobile stations 102, 104, 106 and others, so as to provide those devices with resources such as the ability to communicate with other entities (or with each other) via the RAN. As such, RAN 108 may take various forms, the details of which are not critical and may depend on the air interface protocol of the RAN 108 and on other factors.

A rudimentary RAN, for instance, could take the form of a simple wireless access point router (e.g., a Wi-Fi access point router) coupled with a local area network. Alternatively, the RAN can be more complex, such as a cellular wireless network including one or more base stations, controllers, switches, gateways, and/or other components now known or later developed. Further, it should be noted that RAN 108 may operate according to CDMA, EV-DO, iDEN, TDMA, AMPS, GSM, GPRS, UMTS, EDGE, WiMAX (e.g., IEEE 802.16), LTE, satellite, Wi-Fi (e.g., IEEE 802.11), and/or any other wireless technology or technologies now known or later developed.

In one embodiment, as shown, the RAN 108 may be a cellular RAN that includes at least one base transceiver station (BTS) 112. BTS 112 is then coupled or integrated with a representative WiMAX ASN gateway 113, which provides connectivity with packet-switched network 110, so as to enable mobile stations 102, 104, 106 to communicate via RAN 108 with entities on the packet-switched network 110.

As depicted, BTS 112 operates to define a first wireless sector 118 and a second wireless sector 120. In one embodiment, for instance, when BTS 112 is a single BTS, sector 118 may be a wireless coverage area or sector of a first radio frequency carrier on BTS 112 and sector 120 may be a wireless coverage area or sector of a second radio frequency carrier on BTS 112. In another embodiment, BTS 112 may comprise a plurality of base stations, such as BTS 112A and BTS 112B. In this embodiment, BTS 112A may operate to define sector 118 and BTS 112B may operate to define sector 120.

Packet-switched network 110 may be connected to other mobile stations as well, such as mobile station 124. Packet-switched network 110 may be connected to mobile station 124 via another RAN 126, for instance. Further, packet-switched network 110 may be connected to a computer, such as computer 128. Additionally, packet-switched network may be connected to landline telephones, such as telephone 130 via a gateway 132, for instance, and perhaps other entities.

RAN 108 also includes an overload control mechanism 134. According to the exemplary embodiment, overload control mechanism 134 may operate to help resolve an overload situation in a coverage area of a wireless communication system, such as in sector 118 or sector 120 for instance. As depicted, the overload control mechanism is located at BTS 112. However, this location is merely an example. It should be understood that the overload control mechanism 134 could be located elsewhere, such as outside RAN 108.

In practice, sectors 118 and 120 will each have a quantity of available air-link resources. However, in a given instance, it may be possible that the resources required cooperatively by all of the mobile stations operating in one of these sectors, such as sector 118 for instance, may be greater than the total available resources of the sector. As a simplified example, an overload situation may exist in sector 118 because the resources required cooperatively by mobile stations 102, 104, and 106 are greater than the total resources of sector 118. In such a situation, a mobile station or some mobile stations may need to be released from sector 118 in order to help resolve the overload situation.

In accordance with the exemplary embodiment, overload control mechanism 134 will operate to detect and help resolve an overload situation. For example, overload control mechanism 134 may (i) detect that a threshold load exists in sector 118, and then (ii) hand mobile station 106 over to sector 120 in order to release resources from sector 118 and help resolve the overload situation. Alternatively, if it is not possible to hand off mobile station 106 (e.g., because sector 120 does not have sufficient available resources), overload control mechanism 134 may force mobile station 106 into an idle mode or drop mobile station 106 from wireless communication system 100.

3. Exemplary Overload Control Mechanism

Figure 2:
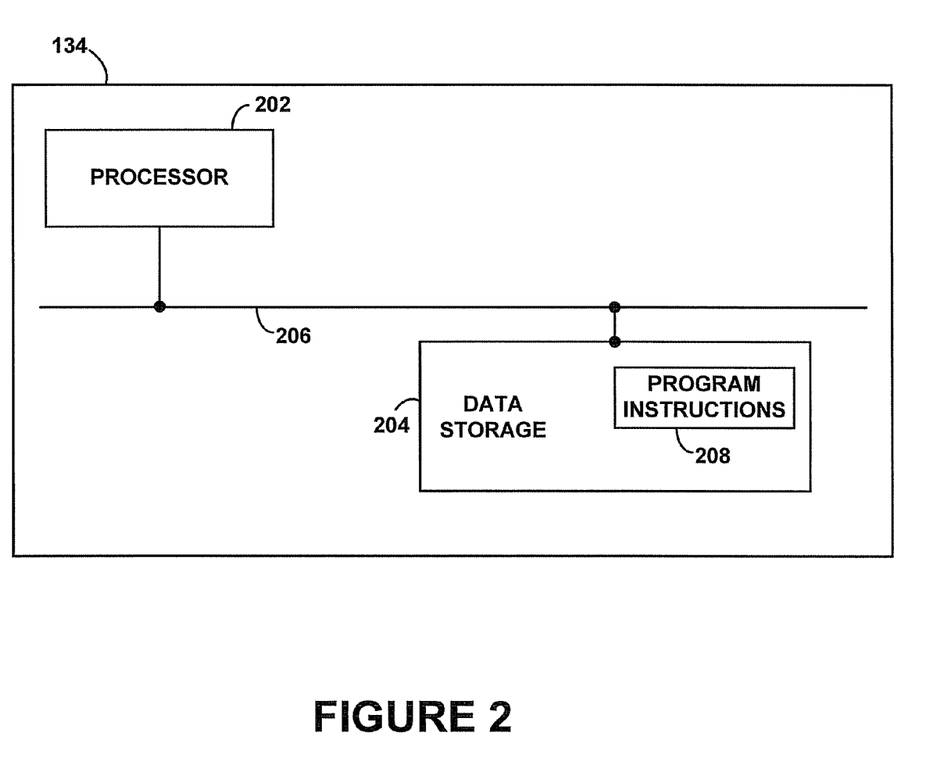
FIG. 2 is a simplified block diagram of an overload control mechanism that can be used in the arrangement of FIG. 1.

A block diagram of an exemplary overload control mechanism 134 is provided in FIG. 2, in order to illustrate some of the components that could be included in such a overload control mechanism to carry out the exemplary embodiment of the invention. As shown in FIG. 2, overload control mechanism 134 may include a processor 202 and data storage 204 communicatively linked by a system bus 206. Processor 202, data storage 204, and system bus 206 could be components of BTS 112. Further, note that overload control mechanism could have additional and/or different components, and that this structure is provided by way of example.

Data storage 204 may take various forms, in one or more parts, such as a non-volatile storage block, and may include program instructions 208 executable by processor 202 for carrying out the overload control mechanism functions described herein (such as identifying an instance of use to eliminate from a coverage area of a wireless communication system in the event of an overload situation). Alternatively, these functions can be carried out by firmware and/or hardware.

Figure 3:
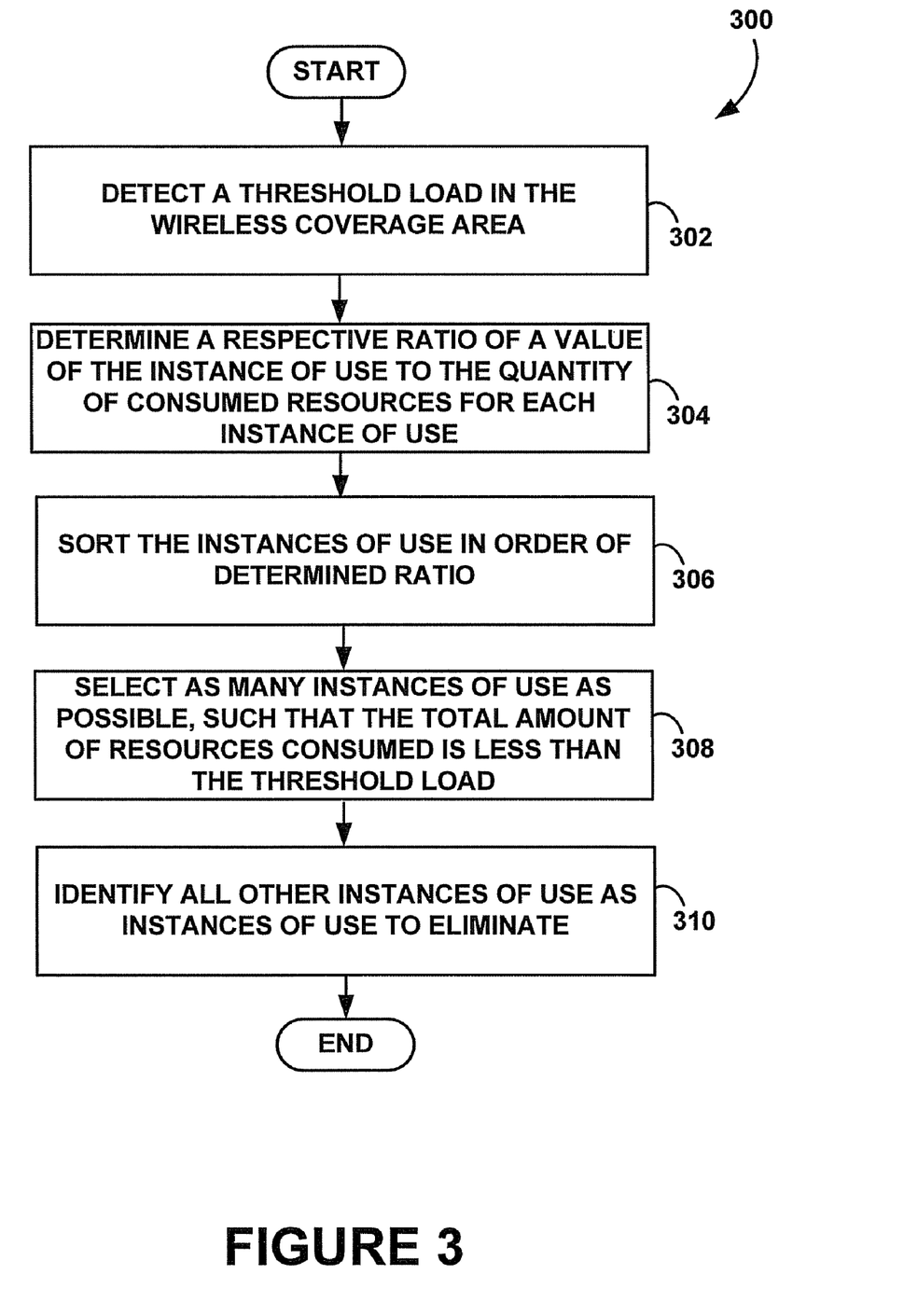
FIG. 3 is a flowchart of a method that can be carried out in accordance with the exemplary embodiment of the invention.
Figure 4:
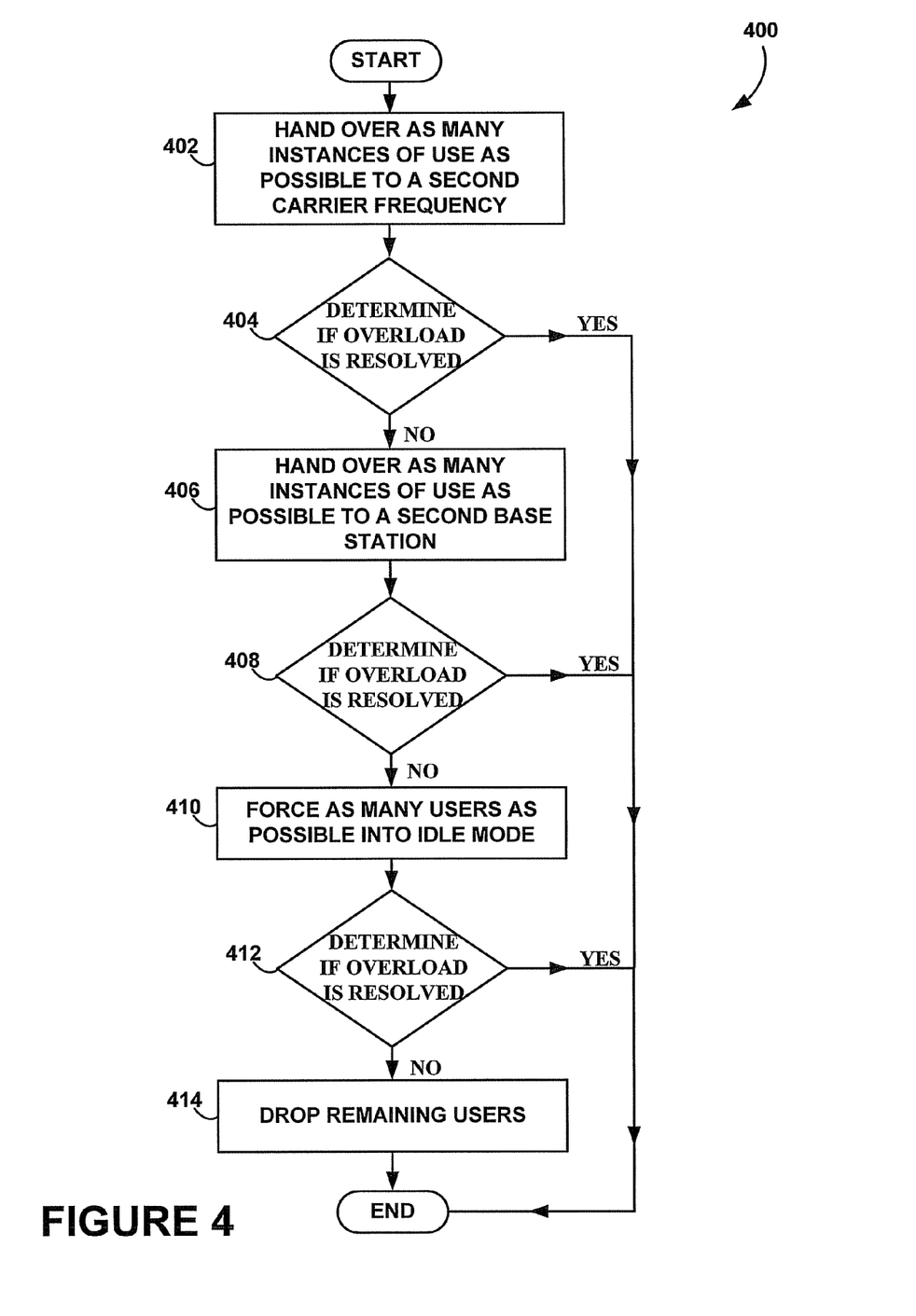
FIG. 4 is a flowchart of a method that can be carried out in accordance with the exemplary embodiment of the invention.

Referring next to FIGS. 3 and 4, flow charts are provided to help illustrate some of the functions that can be carried out in a wireless communication system, such as the wireless communication system depicted in FIG. 1. By carrying out the functions illustrated in FIGS. 3 and 4, the overload control mechanism may help resolve an overload situation in a way that helps to maximize profits for a wireless service provider.

4. Identifying an Instance of Use to Eliminate from the Wireless Coverage Area of the Communication System in the Event of an Overload Situation FIG. 3 is a flow chart illustrating a method of identifying an instance of use to eliminate from among a plurality of instances of use in a wireless coverage area of a wireless communication system in the event of an overload situation. The example of FIG. 3 shows steps performed by the overload control mechanism 134. The goal of method 300 is to maximize the total value per consumed resources of the instances of use in the wireless coverage area, while not exceeding the total available resources of the wireless coverage area.

Method 300 may be carried out in a wireless communication system. Specifically, method 300 may be carried out in a wireless coverage area of a wireless communication system. A wireless coverage area may be defined in various ways. In the exemplary embodiment, sector 118 is a wireless coverage area in which method 300 can be employed. Further, method 300 may be carried out in a plurality of wireless coverage areas. For example, method 300 may be carried out in sector 118 and sector 120. As described above, sector 118 may be the coverage area of BTS 112 operating on a first carrier frequency, and sector 120 may be the coverage area of BTS 112 operating on a second carrier frequency. Alternatively, sector 118 and sector 120 could be sectors defined by two different base stations (e.g., BTS 112A and BTS 112B, respectively). Further, in a wireless communication system having additional sectors and/or base stations, method 300 may be carried out in each coverage area of the wireless communication system. In such a system, the method may be carried out for each sector and/or base station in the system.

In the exemplary embodiment, there are a plurality of instances of use ongoing in the wireless coverage area. In the exemplary embodiment, an instance of use may be any use (e.g., service flow) that a user of a mobile station is engaged in. For example, an instance of use may be a data application (e.g., e-mail), voice over IP (VoIP), push to talk (PTT), video telephony (VT), mobile IPTV, video streaming, or gaming. Other instances of use are possible as well. It should be understood that a user may be engaged in two or more instances of use at the same time. For instance, a user may be engaged in a VoIP call and video streaming concurrently. In an alternative embodiment, a single user may be considered an instance of use, and the single user could be engaged in multiple service flows.

a. Detecting a Threshold Load in the Wireless Coverage Area

At step 302, the overload control mechanism detects a threshold load in sector 118. Sector 118 may have a total quantity of air-link resources available. During operation, mobile stations operating in sector 118 consume air-link resources. In a preferred embodiment, sector 118 operates according to WiMAX technology, which is based on OFDMA access technology over the air-link. In OFDMA technology, the air-link resources are sub-channels (OFDMA tones) and frames (time slots). The mobile stations operating in the sector may embody or be engaged in an instance of use or instances of use. Each instance of use consumes a certain amount of resources from the total amount of resources available in sector 118. The overload control mechanism may monitor the consumed resources of the instances of use ongoing in sector 118 in order to determine if the consumed resources exceed the total quantity of available resources of the sector.

The overload control mechanism may detect a threshold load in sector 118 in a variety of ways. For example, the overload control mechanism may determine at a given point in time the instantaneous air-link resources allocated to each instance of use (i.e., the consumed resources of each instance of use) ongoing in sector 118. The overload control mechanism may then add the consumed resources of each instance of use in order to determine a total amount of consumed resources. In turn, the overload control mechanism may compare the determined total amount of consumed resources to the total amount of resources available in order to detect the presence of overload.

The resources allocated to each instance of use may fluctuate quickly over time. Therefore, rather than repeatedly measuring the instantaneous air-link resources allocated to each instance of use, in a preferred embodiment, for instance, it is more appropriate to keep track of the average resources consumed by each instance of use. The overload control mechanism may add the average resources consumed by each instance of use in order to obtain an aggregate average quantity of resources consumed by all of the instances of use in sector 118. In turn, the overload control mechanism may compare the aggregate average quantity of resources consumed by all the instances of use against the total available resources in order to detect the presence of overload.

In the preferred embodiment, the overload control mechanism calculates the average quantity of resource consumed by each instance of use by using an exponential filter. The exponential filter may take into account the instantaneous air-link resources allocated to a particular instance of use "n" at time "t" ($a_n(t)$). For example, the value of $a_n(t)$ can be calculated by the number of sub-channels allocated to the instance of use times the number of frames allocated to the instance of use. An instance of use with more sub-channels allocated to it consumes more resources than one with fewer sub-channels allocated to it. In this preferred embodiment, the overload control mechanism 134 may calculate the average air-link resources allocated to an instance of use "n" at time "t" ($X_n(t)$) using the following exponential filter:

$$X_n(t) = \left(1 - \frac{1}{\tau}\right) X_n(t-1) + \frac{1}{\tau} a_n(t)$$

In the preferred embodiment, $\tau=1$ second (or equivalently 200 frames). Too large of a value of $\tau$ (e.g., 1 hour) may result in a very long-term average that may be too slow for appropriate overload detection, while too small of a value of $\tau$ (e.g., 5 milliseconds) may result in a noisy estimate of consumed air-link resources.

Overload control mechanism 134 may then keep a sorted list of the average air-link resources consumed by the instances of use ongoing in the wireless coverage area. For example, the list may be $\{X_1, X_2, \ldots X_n\}$, where $X_1$ is the instance of use with the highest amount of consumed resources and $X_i$ is the instance of use with the lowest amount of consumed resources. The overload control mechanism may continually update the values of this list using the exponential filter discussed above. Since the average air-link resources will change over time, the overload control mechanism 134 may re-sort the list after updating the values using the exponential filter.

In a preferred embodiment, the overload control mechanism may re-sort the list using a low complexity sort filter. During a low complexity sort, overload control mechanism may, for instance, set "p" to the end of the list (i.e., to n). When p is greater than 1, overload control mechanism may compare $X_p$ to $X_{p-1}$. If $X_p$ is greater than $X_{p-1}$, the overload control mechanism may switch $X_p$ and $X_{p-1}$ in the list. However, if $X_p$ is less than $X_{p-1}$, the overload control mechanism may keep the values in the same positions. If the values are kept in the same position, the overload control mechanism may then compare $X_{p-1}$ to $X_{p-2}$. If the values were switched, the overload control mechanism may then compare $X_p$ to $X_{p-2}$. Preferably, overload control mechanism 134 performs this low complexity sort until the overload control mechanism reaches the top of the list (i.e., $X_{p-n}$). Once the list is re-sorted, overload control mechanism 134 may check for an overload situation by comparing the total consumed resources to the total available resources. Since the values of $X_i$'s change slowly due to the exponential filtering, only n−1 comparisons may be needed when the low complexity sort is started at the end of the list. In an embodiment, the values $X_i$ are digital. It should be understood that when the digital elements of the list are very close, the list may not be perfectly sorted due to digital sorting limitations and/or errors.

While the above example is described in regards to WiMAX, it should be understood that the overload control mechanism can detect a threshold load in wireless coverage areas of wireless communication systems operating according to other wireless technologies by appropriately defining the consumed resources in such a wireless coverage area and comparing the consumed resources to the total quantity of resources available.

b. Determining a Respective Ratio of a Value of Instance of Use to a Quantity of Resource Consumed by the Instance of Use After detecting a threshold load, the overload control mechanism 134 may help resolve the overload situation. The overload control mechanism may determine at step 304 a respective ratio of a value of the instance of use to the quantity of resource consumed by the instance of use for each instance of use ongoing in the wireless coverage area. The overload control mechanism may determine this ratio in numerous ways.

In a preferred embodiment, the overload control mechanism establishes the value of each instance of use based on the revenue generated from the instance of use. Revenue generated by an instance of use may depend on the service level agreement (SLA) that is in place between the network provider and the users of the mobile stations operating on the network, such as mobile stations 102, 104, and 106. In the exemplary embodiment, different applications may have different values. Therefore, the value of the instance of use may depend on what application the instance of use is. Different types of applications may include, for example, data applications, VoIP, PTT, VT, mobile IPTV, video streaming, and gaming.

Additionally, revenue generated by an instance of use may depend on the user tier that the user of the instance of use belongs to. In the exemplary embodiment, different users in the wireless coverage area may belong to different user tiers. For example, there may be a plurality of tiers, such as a gold tier, a silver tier, and a bronze tier. A user in the gold tier may pay more for service than a user in the silver or bronze tier, and, in turn, may receive a higher quality of service. For example, an SLA of a gold tier user may promise a higher data transfer rate and fewer dropped calls in comparison to an SLA of a bronze tier user. Because a user in the gold tier may pay more for wireless service, instances of use of a gold tier user may have a higher value than the instances of use of a silver or bronze user. For example, the value of a VoIP call for a gold user may have a higher value than a VoIP call for a silver or bronze user, because the gold user pays more for service and, therefore, generates higher revenue for the wireless service provider. Further, the value of some applications of a gold user may be higher than the value of other applications. For example, a voice call may have a higher value than, for example, video streaming. Still further, since value may also depend on the type of application, in some instances, some applications of a lower tier may be assigned a higher value than applications of a higher tier. For example, a VoIP call of a bronze or silver tier user may have a higher value than a streaming video application of a gold tier user.

In addition, the value of a particular application may be dynamic throughout time. For example, assume that a user has an SLA that guarantees less than ten dropped calls per month. If the user has more than ten dropped calls in one month, the SLA states that the user receives a refund of a certain dollar amount. In such a situation, a call by a user of that mobile station may have a higher value when the user has had nine dropped calls already in a month compared with when the user has had only one dropped call in the month.

In another embodiment, value may be determined based on the cost associated with eliminating an instance of use from the wireless coverage area. For example, a first instance of use may be more costly to eliminate from the coverage area than a second instance of use. Therefore, the overload control mechanism may determine that the value of the first instance of use is greater than the value of the second instance of use. In another embodiment, value may be determined by the value of revenue that would be lost if the instance of use was eliminated from the coverage area. It should be understood, that the determinations of value discussed above are set forth as examples only. The value of instances of use may be determined according to other appropriate valuation standards.

As mentioned previously, at step 304 the overload control mechanism may determine a ratio of the value of instance of use to a quantity of resource consumed by the instance of use. Since the ratio depends on the quantity of resources consumed, the ratio may depend on a mobile station's location in the coverage area. Two mobile stations may be engaged in respective instances of use that have the same value; however, one of the mobile stations may be operating close to the base station, while the other may be operating close to the sector edge. In such a situation, the mobile station close to the sector edge may consume more resources. Therefore, the ratio of the value of the instance of use to the quantity of resource consumed by the instance of use will be lower for the mobile station at sector edge than the mobile station near the base station.

For example, mobile stations 104 and 106 may both belong to bronze tier users and the users may both be engaged in a VoIP call. The two VoIP calls may have the same value. However, as depicted in FIG. 1, mobile station 106 is close to the sector edge while mobile station 104 is closer to the center of the sector. Therefore, mobile station 106 may consume more network resources than mobile station 104 for an instance of use that has the same value. Accordingly, the ratio of the value of the instance of use of mobile station 106 to the quantity of resource consumed by the instance of use of mobile station 106 is less than the value of the instance of use of mobile station 104 to the quantity of resource consumed by the instance of use of mobile station 104. Since the ratio is less for mobile station 106, the VoIP call of the mobile station 106 may effectively be less valuable than the VoIP call of mobile station 104. Therefore, in the event of an overload, it may be economically advantageous to eliminate the VoIP call of mobile station 106 from the wireless coverage area while keeping the more valuable VoIP call of mobile station 104 active.

c. Identifying the Instances of Use to eliminate from the Wireless Coverage Area in order to help resolve the Overload Situation Returning to FIG. 3, at step 306, the overload control mechanism 134 may then sort the instances of use in order of their determined ratios, sorting from the highest determined ratio to the lowest determined ratio. Continuing the above example, the determined ratio of the instance of use of mobile station 106 would be placed lower on the list than the instance of use of mobile station 104. In an embodiment, overload control mechanism 134 may sort the determined ratios for each user tier separately and keep a different list for each user tier. Alternatively, overload control mechanism may sort all of the instances of use of each user tier together.

At step 308, overload control mechanism 134 may select as many instances of use as possible from the sorted list (or lists), such that the total amount of resources consumed by the selected instances of use is as high as possible without exceeding the threshold load. The overload control mechanism may begin selecting instances of uses at the instance of use having the highest determined ratio. Continuing the above example described in reference to FIG. 1, overload control mechanism 134 may select the instances of uses of mobile station 102 and 104. However, overload control mechanism 134 may determine that selecting the instance of use of mobile station 106 would exceed the threshold load of sector 118.

Then, at step 310, the overload control mechanism may identify as instances of use to eliminate from the wireless coverage area all of the instances of use in the sorted order other than the selected instances of use. Accordingly, overload control mechanism 134 may identify the instance of use of mobile station 106 as an instance of use to eliminate from sector 118.

5. Eliminating the Selected Instances of Use from the Wireless Coverage Area

After identifying which instances of use to eliminate from the wireless coverage area, the overload control mechanism 134 may operate to eliminate the identified instances of use from the coverage area. The overload control mechanism may eliminate the identified instances of use in a variety of ways. For example, if the wireless communication system includes a base station transmitting on a first carrier to define a coverage area (e.g., sector 118), the overload control mechanism may eliminate the instances of use from the coverage area by handing over the instances of use to a coverage area defined by a second carrier frequency of the same base station (e.g., sector 120). As another example, where the instances of use are at a first base station (e.g., BTS 112A), the overload control mechanism may eliminate the instances of use from the system by handing over the instances of use to a second base station (e.g., BTS 112B).

In order to hand over instances of use to a second carrier of the same base station or a new sector of another base station, the base station may support network-initiated inter-sector or inter-base station handover. Further, in the case of inter-base station handover, the serving base station or the overload control mechanism 134 may need to negotiate the resource availability of the new target base station. Such inter-sector and inter-base station handover is well known in the art and is not discussed in detail here.

As yet another example, the overload control mechanism may eliminate the instances of use from the system by forcing the mobile stations engaged in the instances of use into dormant or idle mode. In idle mode, a mobile station may turn off and therefore not consume air-link resources. When a mobile station is in idle mode, the mobile would still be in the network, but not registered at a particular base station. However, before going into idle mode, a base station may assign the mobile station to a paging group. The mobile could return to an active session through a paging process, such as a paging process as defined in WiMAX or CDMA. Therefore, if air-link resources eventually become available for the mobile station in idle mode, the network could page the mobile station in order to reactivate the communication session. Additionally or alternatively, the overload control mechanism may eliminate the instances of use from the system by dropping the instances of use from the wireless communication system.

As mentioned above, in some situations, a mobile station may have a plurality of ongoing instances of uses. For example, mobile station 102 could be engaged in both a VoIP call and in a video streaming session. It should be understood that the overload control mechanism may eliminate some instances of use of a mobile station from the wireless coverage area while maintaining other instances of use of the same mobile station in the wireless coverage area. For example, the overload control mechanism 134 could drop the video streaming session of mobile station 102 yet keep the VoIP call active.

In a preferred embodiment, when eliminating instances of uses from the wireless coverage area, the overload control mechanism may first attempt to hand over the instances of uses to a second carrier of the same base station. If overload still exists, the overload control mechanism may then attempt to hand over the instances of uses to a second base station. If overload still exists, the overload control mechanism may then attempt to force the mobile stations of the instances of uses into idle mode. Finally, if overload still exists in the coverage area, the overload control mechanism may drop the instances of use from the wireless communication system.

FIG. 4 is a flow chart of a method of eliminating the instances of use from the wireless coverage area, according to this preferred embodiment. At step 402, the overload control mechanism 134 may hand over as many instances of use as possible to a second carrier frequency. The overload control mechanism may then determine if the overload situation is resolved at step 404. If the overload situation is not resolved, overload control mechanism may then attempt to hand over as many instances of uses as possible to a second base station at step 406. Once again, the overload control mechanism may then determine if the overload situation is resolved at step 408. If the overload situation is still not resolved, the overload control mechanism may then attempt to force as many users as possible into idle mode at step 410. Once again, the overload control mechanism may then determine if the overload situation is resolved at step 412. Finally, if the overload situation has still not been resolved, the overload control mechanism may drop the remaining users in order to help resolve the overload situation.

It should be understood, that attempting to eliminate the instances of uses in this order is merely an example of how to eliminate instances of use from the wireless coverage area to help resolve an overload of system resources. In some situations, for instance, the overload control mechanism may not need to attempt to hand over instances of use to a second carrier on the same base station if there is only one carrier on that base station. As another example, if the overload control mechanism determines that a second base station does not have available resources, the overload control mechanism would not attempt to hand over the instances of use to that base station.

6. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A method of identifying an instance of use to eliminate from among a plurality of instances of use in a coverage area of a wireless communication system, the method comprising:
   detecting, by an overload control mechanism, a threshold load in the coverage area;
   for each instance of use, determining a respective ratio of a value of instance of use to a quantity of resource consumed by the instance of use;
   sorting, by the overload control mechanism, the instances of use in order of their determined ratios, to produce a sorted order of the instances of use, sorting from a highest determined ratio to a lowest determined ratio;
   in sorted order, beginning at the instance of use having the highest determined ratio, selecting as many instances of use as possible, such that the total amount of resources consumed by the selected instances of use is as high as possible without exceeding the threshold load;
   identifying as instances of use to eliminate from the coverage area all of the instances of use in the sorted order other than the selected instances of use.

2. The method of claim 1, wherein the instances of use comprise service flows in the coverage area.

3. The method of claim 1, wherein the instances of use comprise a plurality of uses of a single user in the coverage area.

4. The method of claim 1, further comprising:
   eliminating from the coverage area all of the instances of use in the sorted order other than the selected instances of use.

5. The method of claim 4, wherein the wireless communication system comprises a base station transmitting on a first carrier frequency, wherein at least one of the instances of use is on the first carrier frequency, and wherein eliminating from the coverage area all of the instances of use in the sorted order other than the selected instances of use comprises handing over the at least one of the instances of use to a second carrier frequency on the base station.

6. The method of claim 4, wherein the wireless communication system comprises a first base station, wherein at least one of the instances of use is at the first base station, and wherein eliminating from the coverage area all of the instances of use in the sorted order other than the selected instances of use comprises handing over at least one of the instances of use to a second base station.

7. The method of claim 4, wherein eliminating from the coverage area all of the instances of use in the sorted order other than the selected instances of use comprises forcing at least one of the instances of use into idle mode.

8. The method of claim 4, wherein eliminating from the coverage area all of the instances of use in the sorted order other than the selected instances of use comprises dropping at least one of the instances of use from the wireless communication system.

9. The method of claim 1, wherein determining a respective ratio of a value of instance of use to a quantity of resource consumed by the instance of use comprises establishing the value of each instance of use based on the revenue generated from the instance of use.

10. The method of claim 1, wherein determining a respective ratio of a value of instance of use to a quantity of resource consumed by the instance of use comprises determining the value of revenue that would be lost if the instance of use were eliminated from the coverage area.

11. The method of claim 1, further comprising carrying out the method for each of a plurality of coverage areas.

12. The method of claim 1, further comprising carrying out the method for each of a plurality of base stations in a wireless communication system.

13. The method of claim 1, wherein a user of the system belongs to a user tier among a plurality of user tiers, and wherein the value of the instances of use of the user is dependent on the user tier.

14. The method of claim 13, wherein the plurality of user tiers comprises a first tier and a second tier, wherein a first value is assigned to an instance of use in the first tier, wherein a second value is assigned to an instance of use in the second tier, and wherein the first value is greater than the second value.

15. The method of claim 1, wherein the coverage area has a total amount of resources, and wherein detecting a threshold load in the coverage area comprises:
   keeping track of an average quantity of recourse consumed by each instance of use of the instances of uses; and
   adding the average quantity of resource consumed by each instance of use of the instances of uses to determine a total average quantity of resources consumed by the instances of uses; and
   determining that the total average quantity of resources is greater than the total amount of resources.

16. A radio access network for overload control, the radio access network comprising:
- at least one antenna structure for engaging in communication with a mobile station over an air interface;
- a processor;
- data storage;
- program logic stored in the data storage and executable by the processor, to carry out functions including:
  - detecting a threshold load in a coverage area of a wireless communication system;
  - for each instance of use, determining a respective ratio of a value of instance of use to a quantity of resource consumed by the instance of use;
  - sorting the instances of use in order of their determined ratios, to produce a sorted order of the instances of use, sorting from a highest determined ratio to a lowest determined ratio;
  - in sorted order, beginning at the instance of use having the highest determined ratio, selecting as many instances of use as possible, such that the total amount of resources consumed by the selected instances of use is as high as possible without exceeding the threshold load; and
  - identifying as instances of use to eliminate from the coverage area all of the instances of use in the sorted order other than the selected instances of use.

17. The radio access network of claim 16, wherein the program logic is further executable by the processor to eliminate all of the instances of use in the sorted order other than the selected instances of use from the coverage area.

18. The radio access network of claim 17, further comprising a base transceiver station, wherein the processor and data storage are located at the base transceiver station.

19. The radio access network of claim 16, wherein the radio access network operates according to an air interface protocol selected from the group consisting of CDMA, iDEN, TDMA, AMPS, GSM, GPRS, UMTS, EDGE, WiMAX, LTE, satellite, and Wi-Fi.

* * * * *